United States Patent

[11] 3,598,994

[72] Inventor David A. Markle
Wilton, Conn.
[21] Appl. No. 760,834
[22] Filed Sept. 19, 1968
[45] Patented Aug. 10, 1971
[73] Assignee The Perkin-Elmer Corporation
Norwalk, Conn.

[54] METHOD AND APPARATUS FOR SENSING FLUORESCENT SUBSTANCES
10 Claims, 2 Drawing Figs.
[52] U.S. Cl. .................................................. 250/71,
250/214, 356/96, 356/97
[51] Int. Cl. .............................................. G01n 21/22
[50] Field of Search ........................................ 250/71,
71.5, 214; 356/96, 97

[56] References Cited
UNITED STATES PATENTS
2,620,445 12/1952 Tyler ............................. 250/71
3,151,204 9/1964 Stacy ............................ 250/71
3,414,729 12/1968 Warren ....................... 356/97 UX Primary Examiner—Archie R. Borchelt
Assistant Examiner—Morton J. Frome
Attorney—Edward R. Hyde, Jr.

ABSTRACT: A method and apparatus for sensing fluorescent radiation emitted by a sample material using sunlight as the source of exciting radiation. A bundle of direct sunlight is encoded and split into beams each of which is combined with similar portions of a bundle of light containing solar reflected and solar-excited fluorescent energy components from the sample material. The sample bundle is encoded differently from the direct sunlight or reference bundle so that it may be distinguished subsequently. The two beams (each of which contain reference and sample components) are passed through two spectral filters and detected photoelectrically. One of the spectral filters is centered on a Fraunhofer absorption line. The other filter is centered a few Angstroms away in the solar continuum. The four signals corresponding to the intensity of the sample and reference beam components passing through each of the two spectral filters are separated electronically and combined in an analogue computer to yield a signal proportional to the fluorescivity of the sample material.

PATENTED AUG 10 1971 3,598,994

INVENTOR.
David A. Markle
BY
Irving M. Kriegsman
ATTORNEY

METHOD AND APPARATUS FOR SENSING FLUORESCENT SUBSTANCES

This invention relates to a method and apparatus for sensing fluorescence. More particularly, this invention relates to a method and apparatus for detecting and measuring the proportion of fluorescent radiation emitted by a sample material in a narrow, preselected wavelength band using sunlight as the source of exciting radiation.

The fluorescence phenomina of certain substances is now well established. Insofar as the wavelength region at which a fluorescent substance will fluorence is fairly narrow and generally different for different materials, by detecting and measuring the amount of fluorescent radiation emitted by a sample material at a particular wavelength region it is possible to qualitatively and quantitately analyze a sample material for a specific fluorescent substance.

The amount of a particular fluorescence substance in a sample material is generally measured in the laboratory by illuminating the sample with wavelengths shorter than the stimulated emission wavelengths and then measuring the amount of light emitted by the sample at wavelengths longer than the excitation wavelengths; the latter being the wavelengths at which the particular fluorescent substance will fluoresce. One disadvantage of this technique is that it cannot be used outside in sunlight. Another disadvantage is that the sample material must be relatively near the light source.

Within the last several years it has been reported in the literature that astronomers have succeeded in detecting luminescence (fluorescence being one form of luminescence) on the surface of the moon utilizing Fraunhofer absorption lines created in the photosphere of the sun. According to this technique two spectral profiles are made using a spectrophotometer. One of the profiles is of direct sunlight (or reflected sunlight from a nonfluorescent target) and the other is of sunlight reflected off the moon. Both profiles are of the same spectral region and include at least one Fraunhofer line. By comparing the two profiles and in particular, the relative depth of any one Fraunhofer line in each profile, the luminescence in the region of that Fraunhofer line can be calculated. One disadvantage of this technique is that it does not provide a measure of luminescence directly, but merely spectral profiles from which the luminescence at certain wavelengths can be calculated. Furthermore, this technique permits only a very limited number of samples to be taken per unit time increment.

Accordingly, it is an object of this invention to provide a new and improved method and apparatus for detecting fluorescence.

It is another object of this invention to provide a method and apparatus for automatically detecting and measuring the amount of a certain fluorescent substance present in a sample material at a remote location.

It is still another object of this invention to provide a method and apparatus for detecting and measuring fluorescence in a sample material using sunlight as the source of exciting radiation.

It is yet still another object of this invention to provide an apparatus for indicating directly the fluorescivity of a sample material at a well defined wavelength.

The above and other objects are achieved by means of the method and apparatus of this invention.

Briefly, the invention involves measuring the intensity of sunlight directly from the sun and the intensity of sunlight reflected off the material being examined at two preselected wavelengths (i.e. wavelength bands). One of these wavelengths is at a preselected Fraunhofer absorption line and the other wavelength is a few Angstroms away from the preselected Fraunhofer absorption line and in the solar continuum. Thus, four signals proportional to intensity are produced. These four signals are then converted into a single signal which is proportional to the amount of fluorescence in the vicinity of that Fraunhofer absorption line. This signal may be read on a metal and/or recorded.

The basic theory involved is as follows. The solar spectrum contains a number of very sharp (Fraunhofer) absorption lines created in the photosphere of the sun. When sunlight is reflected, some wavelengths tend to be reflected more than others, but the variation of reflectivity with wavelength is relatively smooth and these deep absorption lines are retained in the reflected component. The same is not true of fluorescence, which is characterized by a strong absorption in one spectral region followed by reemission at longer wavelengths. The reemission process completely removes the sharp Fraunhofer lines yielding a relatively smooth emission spectrum. Any addition of a fluorescence spectrum to a reflected solar spectrum therefore tends to reduce the relative depth of the Fraunhofer absorption lines near the fluorescence emission peak.

One feature of the invention involves the use of a narrow bandwidth filter for transmitting light within a selected Fraunhofer absorption band while rejecting light on either side of the selected Fraunhofer absorption band. Another feature of the invention involves the overall technique for producing readable and/or recordable signals from which the fluorescence emitted by a sample material at a certain wavelength can be determined. Another feature of the invention involves the overall technique for producing a signal representing the fluorescence emitted by a sample material at a certain wavelength.

Other features and advantages of the invention will become apparent on reading the following detailed description when taken in connection with the drawings in which like reference numerals represent like parts and wherein.

Figure 1:
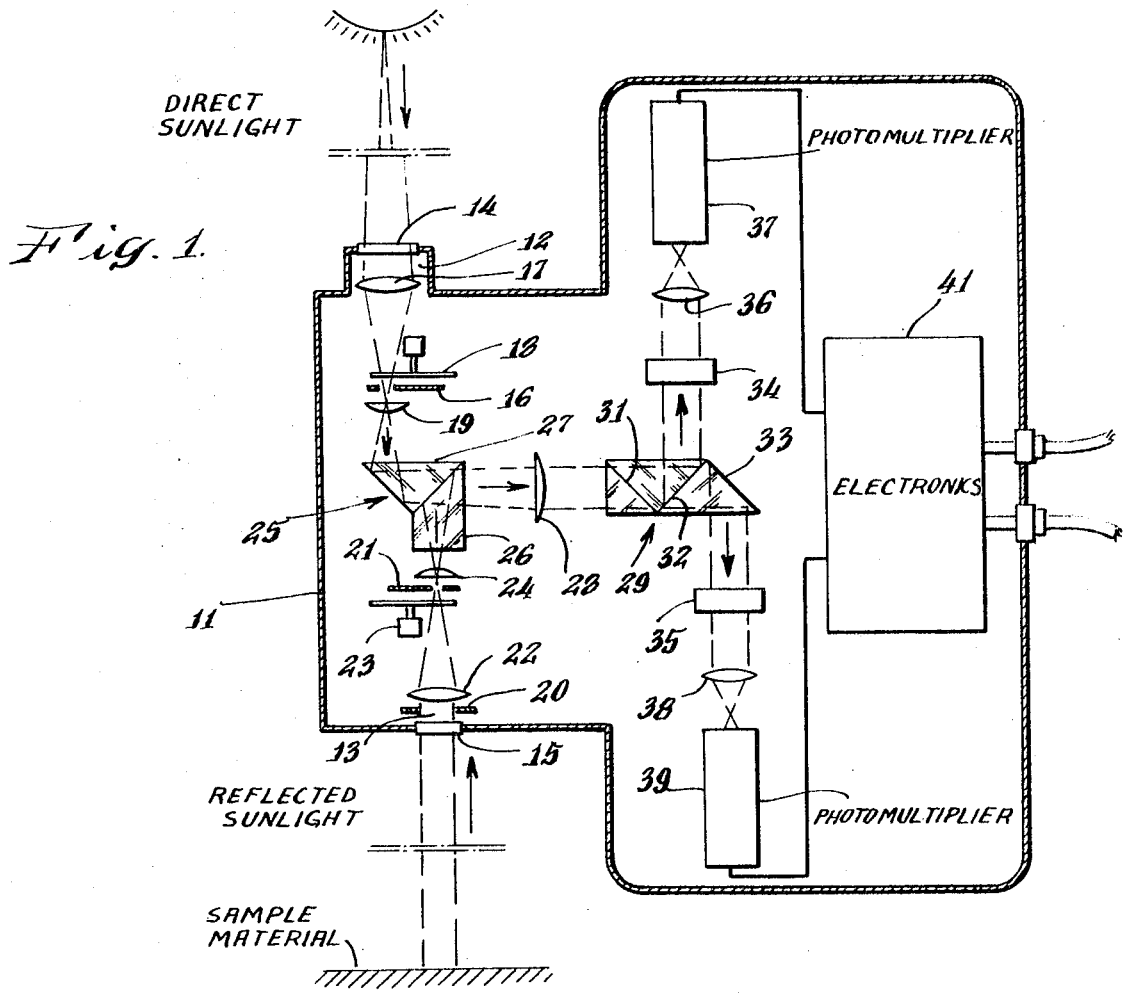
FIG. 1 is a diagrammatic plan view of an embodiment of the invention.

Referring now to the drawings, there is shown in FIG. 1 an apparatus constructed according to this invention.

The apparatus includes a gastight boxlike casing 11 which has an aperture 12 at the top for admitting light directly from the sun and sky and an aperture 13 at the bottom for admitting reflected sunlight and solar stimulated fluorescent radiation from the material being examined. Aperture 12 is sealed off with a light scattering element 14. The purpose of light scattering element 14 is to collect light from the sun regardless of the sun's position in the sky. Aperture 13 is sealed off with an ordinary window 15.

Light entering aperture 12 is brought to focus at a field stop 16 by means of an objective lens 17, chopped at a preselected frequency by means of a light chopper 18 and passed through a field lens 19.

Light entering aperture 13 is passed through an aperture stop 20, brought to focus at a field stop 21 by means of an objective lens 22, chopped at a different preselected frequency by means of a light chopper 23 and passed through a field lens 24.

The two emerging bundles of chopped light, which are chopped at different frequencies so that they can be distinguished from each other, are then combined by means of a beamsplitter assembly 25 made up of beamsplitter elements 26 and 27. One of the emerging bundles of light is then collimated by means of a lens 28 and enters a prism block 29. The ratio of reflected sunlight transmitted by the beamsplitter assembly 25 to direct sunlight transmitted by the beamsplitter assembly 25 is dependent on reflectivity of the sample material being examined for fluorescent substances. Prism block 29 has three 45° surfaces 31, 32 and 33. Surface 31 has a polarization coating (not shown) which rejects one plane of polarization. Surface 32 splits the light beam in a ratio of 1 to 1, and surface 33 is a mirror to fold the optical path.

The light beam reflected off surface 32 is passed through light filter 34 and the light beam reflected off surface 33 is passed through a light filter 35. The purpose of filter 34 is to pass light within a particular preselected Fraunhofer absorption band and reject all other light. A typical Fraunhofer absorption line has a bandwidth of between 0.5A. and 1.0A. Accordingly, an extremely narrowband filter centered on the Fraunhofer lines is required. The purpose of filter 35 is to pass light over a narrowband a few Angstroms away from the preselected Fraunhofer absorption line and reject all other light. In the embodiment shown, both filters are the Fabry-Perot type.

Light emerging from filter 34 is passed through a condenser lens 36 and into a light detector such as photomultiplier tube 37. Light emerging from filter 35 is passed through a condenser lens 38 and into a light detector such as photomultiplier tube 39.

In this configuration, the output of each photomultiplier tube contains two multiplexed components centered about the two chopping frequencies, the output of photomultiplier tube 37 being proportional to the intensities at the Fraunhofer line and the output of photomultiplier tube 39 being proportional to the intensities a few Angstroms away from the Fraunhofer line. The outputs of both photomultipliers are fed into the electronics section 41 of the apparatus which converts each of the two frequency multiplexed signals into four separate signals which are used to compute a single signal proportional to fluorescivity. It is also possible to separately encode the two beams from each filter so that only a single photodetector is required. In this way the indicated fluorescence level can be made independent of any photodetector or amplifier gain changes, whereas if two photodetectors are used, gain changes of one photodetector, with respect to the other, affects the scaling but not the limiting sensitivity of the instrument.

The computation of fluorescivity from the four signals amounts to solving the following equation:

$$P = K/A - B \ (C - DB/A$$

where:
- $P$ = the fluorescence level,
- $A$ = the direct solar intensity beside the selected Fraunhofer line,
- $B$ = the direct solar intensity inside the selected Fraunhofer line,
- $C$ = the reflected solar intensity inside the selected Fraunhofer line,
- $D$ = the reflected solar intensity beside the selected Fraunhofer line,
- $K$ = A constant of proportionality which depends upon the beamsplitter ratios, etc.

Figure 2:
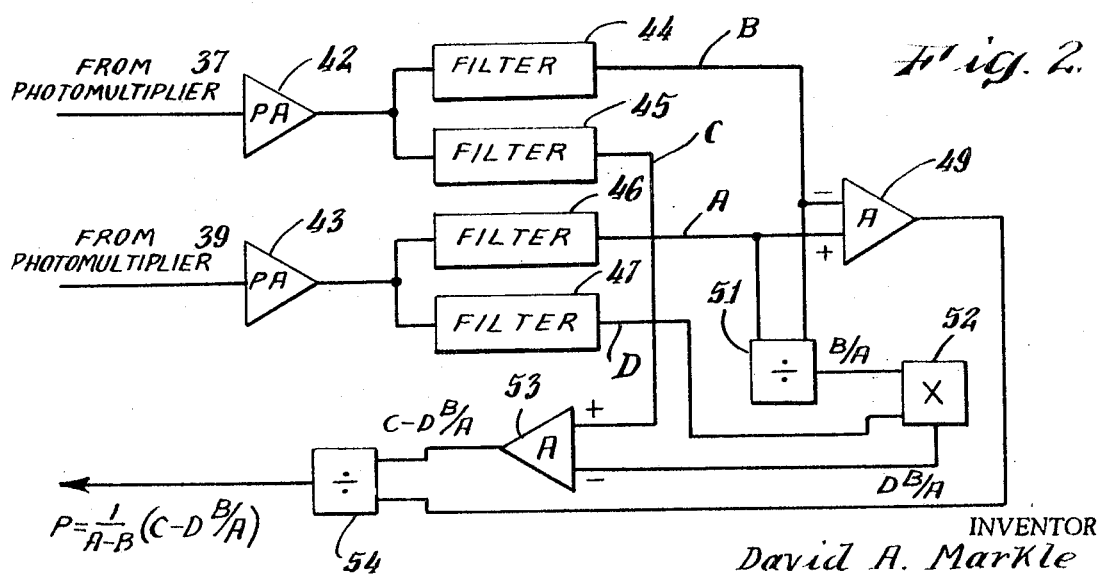
FIG. 2 is a schematic diagram of the electronics portion of the embodiment of the invention shown in FIG. 1.

Referring now to FIG. 2, there is shown in detail the electronics portion of the apparatus.

Photomultipliers 37 and 39 are connected to preamplifiers 42 and 43 respectively. The output of preamplifier 42 is fed into filters 44 and 45. Similarly, the output of preamplifier 43 is fed into filters 46 and 47. Using the formula $P = K/A - B \ (C-DB/A)$ the outputs of filters 44, 45, 46 and 47 correspond to letters $B$, $C$, $A$ and $D$ respectively. Outputs $A$ and $B$ are fed into a differential amplifier 49. Outputs $A$ and $B$ are also fed into an electrical analogue divide module 51 whose output, which corresponds to $B/A$, is fed into an electrical analogue multiplication module 52. Output $D$ is also fed into an electrical analogue multiplication module 52. The output of multiplication module 52 which corresponds to $DB/A$ is then fed into a differential amplifier 53 along with output $C$. The output of differential amplifier 53 which corresponds to $C-DB/A$ is fed into an electrical analogue divide module 54. The output of divide module 54 corresponds to $1/A-B \ (C-DB/A)$ which is proportional to the fluorescivity $P$.

The apparatus has been successfully used in sensing rhodamine $B$, a substance which is fluorescent in the 5,890A. region. For this application filter 34 had a bandwidth of 0.7A. and was centered at the 5,890A. Fraunhofer absorption line and filter 35 had a similar bandwidth and was centered at 5,892A. Both filters were Fabry-Perot type filters. Chopper 17, chopped the direct sunlight at 240 Hz and chopper 23 chopped the reflected sunlight at 480 Hz.

As is evident, by centering the filters at other wavelengths, the apparatus can be used for detecting fluorescence at other wavelength regions.

The apparatus may be used either on the ground or in an airplane or other type of vehicle. One application for the apparatus is in detecting impurities such as detergents or oil slicks in water. Other applications include tracing the diffusion, flow and mixing of water in rivers, lakes and oceans which have been tagged with fluorescent dyes and prospecting for certain fluorescent minerals.

Obviously, many modifications and variations of the present invention are possible in light of the above teachings. It is therefore to be understood that within the scope of the appended claims, the invention may be practiced otherwise than as specifically described.

I claim:

1. An apparatus for use in sensing fluorescent radiation emitted by a material when excited with sunlight comprising:
   a. means for forming a bundle of direct sunlight;
   b. means for encoding said bundle of direct sunlight;
   c. means for forming a bundle of reflected sunlight and solar stimulated fluorescence radiation from the material;
   d. means for encoding said bundle of reflected sunlight and solar stimulated fluorescence radiation differently from said bundle of direct sunlight;
   e. means for combining the two encoded bundles of light into two different bundles each of which contain direct sunlight and reflected sunlight and solar stimulated fluorescence radiation;
   f. one filter means disposed along the path of one of said bundle parts for passing only light within a preselected Fraunhofer absorption line;
   g. other filter means disposed along the path of the other of said bundle parts for passing light in the solar continuum near the said preselected Fraunhofer absorption line;
   h. means measuring the intensity of light passed by said filter means and converting the light from each into one signal proportional to the intensity of the direct sunlight portion thereof and into another signal proportional to the portion thereof that consist of reflected sunlight and solar stimulated fluorescence radiation; and
   i. means receiving said four signals and converting them into a single signal proportional to the solar stimulated fluorescence radiation from the material.

2. The apparatus according to claim 1 and wherein said means for encoding said bundle of direct sunlight comprises a first light chopper which chops the light at a first frequency and the means for encoding said bundle of reflected sunlight and solar stimulated fluorescent radiation comprises a second light chopper which chops the light at a second frequency different from the first frequency.

3. The apparatus according to claim 2 at wherein said first light chopper chops the light at 240 Hz and the second light chopper chops the light at 480 Hz 4. The invention according to claim 1 and wherein each filter means comprises a narrowband Fabry-Perot type filter.

5. The invention according to claim 1 and wherein said preselected Fraunhofer absorption line is at 5,890A, wherein said apparatus may be used in sensing the substance rhodamine B.

6. The invention according to claim 1 and wherein said means for measuring the intensity of light passed by each filter means comprises a photomultiplier tube.

7. The invention according to claim 1 and wherein said means for combining the two encoded bundles of light into two different bundles comprise a first beamsplitter assembly for combining the two encoded bundles into a single bundle 8. A method of sensing the fluorescent radiation emitted by a material when excited by sunlight comprising:
   a. forming a bundle of light directly from the sun;
   b. forming a bundle of light from the sun reflected by the material;
   c. encoding each bundle of light so formed differently;
   d. combining both encoded bundles of light into two mixed bundles of light;

e. measuring the intensity of the direct sunlight portion and of the portion that consists of reflected sunlight and solar stimulated fluorescence radiation in each mixed bundle, measuring the intensities thereof both in a wavelength band located within a preselected Fraunhofer absorption line and in a wavelength band that is located near said Fraunhofer absorption line and in the solar continuum, and f. combining said four measurements to determine the proportional solar stimulated fluorescence radiation from the material.

9. Apparatus for use in sensing fluorescent radiation emitted by a target material when illuminated with sunlight comprising:
   a. means for collecting radiation directly from the sun and forming thereby a bundle of direct sunlight;
   b. means for encoding the bundle of direct sunlight;
   c. means for collecting radiation from the target and forming thereby a bundle of reflected sunlight and solar stimulated fluorescence radiation;
   d. means for encoding the bundle of target radiation differently from the bundle of direct sunlight;
   e. means for combining the two encoded bundles of light into two bundles of mixed light;
   f. means for producing a first signal proportional to the intensity of light in one of said bundles over a wavelength band within a preselected Fraunhofer absorption line;
   g. means producing a second signal proportional to the intensity of light in the other of said bundles over a wavelength band close to the preselected Fraunhofer absorption lines but in the solar continuum; and
   h. means converting each of said first and said second signals into two signals proportional respectively to the intensity of the direct sunlight and to the intensity of the reflected sunlight and solar stimulated fluorescence radiation in the respective bundles thereby producing four signals from which to determine the presence of and relative quantity of solar stimulated fluorescence radiation from the target.

10. The apparatus according to claim 9 including means receiving said four signals and converting them into a single signal proportional to the solar stimulated fluorescence radiation from the target in accordance with the formula: $P = 1/A - B (C - DB/A)$ where:
$A$ = the intensity of direct sunlight in the solar continuum close to the Fraunhofer line,
$B$ = the intensity of direct sunlight within the preselected Fraunhofer line,
$C$ = the intensity of reflected sunlight and solar stimulated fluorescence within the preselected Fraunhofer line,
$D$ = the intensity of reflected sunlight and solar stimulated fluorescence in the solar continuum close to the Fraunhofer line.

UNITED STATES PATENT OFFICE
CERTIFICATE OF CORRECTION

Patent No. 3,598,994　　　　　　　　Dated August 10, 1971

Inventor(s) David A. Markle

It is certified that error appears in the above-identified patent and that said Letters Patent are hereby corrected as shown below:

Column 1, after the first paragraph, insert the following paragraph:

--The invention described herein was made in the performance of work under a NASA contract and is subject to the provisions of Section 305 of the National Aeronautics and Space Act of 1958, Public Law 85-568 (72 Stat. 435; 42 U.S.C. $\S$ 2457).--

Claim 7, at the end, add the following two lines:

--and a second beamsplitter assembly for dividing the single bundle so formed into two mixed bundles.--

Signed and sealed this 9th day of May 1972.

(SEAL)
Attest:

EDWARD M. FLETCHER, JR.　　　　　　ROBERT GOTTSCHALK
Attesting Officer　　　　　　　　　Commissioner of Patents